United States Patent
Tajima (10) Patent No.: US 7,055,958 B2
(45) Date of Patent: Jun. 6, 2006

(54) IMAGE PROJECTION METHOD AND DEVICE

(75) Inventor: Johji Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 103 days.

(21) Appl. No.: 10/921,877

(22) Filed: Aug. 20, 2004

(65) Prior Publication Data

US 2005/0041217 A1 Feb. 24, 2005

(30) Foreign Application Priority Data

Aug. 22, 2003 (JP) ............................. 2003-298933

(51) Int. Cl.
*G03B 21/14* (2006.01)

(52) U.S. Cl. ..................................... 353/69
(58) Field of Classification Search ............... 353/69, 353/70, 122, 101; 348/745, 806, 746, 747
See application file for complete search history.

(56) References Cited

U.S. PATENT DOCUMENTS

| 5,790,210 | A | 8/1998 | Kim et al. | |
|---|---|---|---|---|
| 6,317,199 | B1 | 11/2001 | Suzuki | |
| 6,416,186 | B1 | 7/2002 | Nakamura | |
| 6,520,647 | B1 * | 2/2003 | Raskar | 353/70 |
| 6,846,081 | B1 * | 1/2005 | Mochizuki et al. | 353/70 |
| 2003/0210381 | A1 * | 11/2003 | Itaki | 353/70 |
| 2004/0165154 | A1 * | 8/2004 | Kobori et al. | 353/69 |

FOREIGN PATENT DOCUMENTS

| JP | 2002-62842 A | 2/2002 |
|---|---|---|
| WO | WO 01/47259 A1 | 6/2001 |
| WO | WO 03/017655 A1 | 2/2003 |

OTHER PUBLICATIONS

Patent Abstracts of Japan, vol. 1998:04, Mar. 31, 1998, & JP 09 325018 (abstract only).
Patent Abstracts of Japan, vol. 2000:12, Jan. 3, 2001, & JP 2000 249543 (abstract only).
N. Otsu, "An Automatic Threshold Selection Method Based on Discriminant and Least Squares Criteria," UDC 80/4 vol. J63-D No. 4, pp. 349-356.

* cited by examiner

*Primary Examiner*—William C. Dowling
(74) *Attorney, Agent, or Firm*—Foley & Lardner LLP (57) ABSTRACT

An image projection device includes a distance measuring device which determines a screen distance between the image projection device and a screen. An image sensor captures a shape of the screen and a screen detector detects a sensor-view shape of the screen from the captured image of the screen. The sensor-view shape of the screen is transformed to a projector-view shape of the screen by a coordinate transformer based on the screen distance. A controller modifies an image to be projected so as to fit it to the projector-view shape of the screen. The modified image is projected on the screen.

11 Claims, 8 Drawing Sheets

FIG. 2

30 PROJECTED IMAGE AREA (0,0)

CAPTURED IMAGE (S)

SCREEN IMAGE 20i (u1,v1)
(u2,v2)
(u3,v3)
(u4,v4)

IMAGE PROJECTION METHOD AND DEVICE

BACKGROUND OF THE INVENTION

1. Field of the Invention

The present invention relates to image projection techniques, and particularly relates to an image projection method and an image projection device that projects an image to a screen by automatically fitting the projected image to the screen.

2. Description of the Related Art

Conventionally, an image projection device projects an image on a screen on the precondition that the screen is disposed right in front of the image projection device. Actually, however, there may be cases where the screen is not disposed right in front of the image projection device and the image is projected from an oblique direction. In such cases, the projected image is displayed with distortion, so that the correction of trapezoidal distortion, the independent correction of the four corners of the image or the like is needed.

For example, Japanese patent application unexamined publication No. 2002-62842 discloses a projected image correction method that corrects a projected image on a predetermined-size screen based on screen location and tilt detected by processing an image captured by a camera.

However, confirmation, such as whether the projected image fits the position of the screen and whether the four corners of the projected image fit the four corners of the screen, is manually carried out. Thus, the user needs learning usage and getting used to actual use. This becomes constraint on the use of such an automatic correction function.

SUMMARY OF THE INVENTION

An object of the present invention is to provide an image projection method and an image projection device allowing an image to be automatically fit to the screen and distortion of the projected image to be corrected.

According to the present invention, the above object can be achieved by measuring or estimating a screen distance, detecting the shape of the screen using image recognition technology, and controlling an image projecting position in accordance with the detection result and the screen distance.

According to an aspect of the present invention, an image projection device includes: an image projector for projecting an image on a screen; an image sensor for capturing an image of the screen; a distance determining section for determining a screen distance between the image projection device and the screen; a screen detector for detecting a sensor-view shape of the screen from the captured image of the screen; a screen shape transformer for transforming the sensor-view shape of the screen based on the screen distance to produce a projector-view shape of the screen; and an image modifier for modifying an image to be projected so as to fit it to the projector-view shape of the screen to output the modified image to the image projector.

As an embodiment of the present invention, the screen shape transformer includes a coordinate transformer for transforming a sensor coordinate system describing the sensor-view shape of the screen to a projector coordinate system depending on the screen distance, to produce the projector-view shape of the screen.

The coordinate transformer may include: a plurality of coordinate transformation tables, each of which stores a correspondence between the sensor coordinate system and the projector coordinate system for a corresponding one of a plurality of predetermined screen distances; and an interpolator for interpolating a plurality of projector-view shapes of the screen based on the screen distance to produce the projector-view shape of the screen corresponding to the sensor-view shape of the screen, wherein the plurality of projector-view shapes of the screen are obtained from respective ones of the coordinate transformation tables when inputting the sensor-view shape of the screen.

As another embodiment of the present invention, the screen shape transformer includes: a distance estimator for estimating a screen point distance between the image projection device and each of a plurality of representative points of the screen based on the screen distance and the sensor-view shape of the screen; and a coordinate transformer for transforming a sensor coordinate system describing the sensor-view shape of the screen to a projector coordinate system depending on estimated screen point distances for the representative points, to produce the projector-view shape of the screen.

The distance determining section may employ various means such as a distance measuring device which measures the screen distance by monitoring a transmitted signal reflected from the screen.

The distance determining section may include: a focus evaluator for evaluating a degree of focus of the image projected on the screen based on the captured image of the screen; a focus controller for changing a focus position of the image projector; and a distance calculator for calculating the screen distance by determining a focus position maximizing the degree of focus of the image projected on the screen.

The distance determining section may include: a focus controller for setting the image projector at a predetermined focus position; and a distance estimator for estimating the screen distance from a degree of defocus of the captured image.

As another aspect of the present invention, an image projection method for an image projection device having an image projector and an image sensor, includes: a) capturing an image of the screen by the image sensor; b) determining a screen distance between the image projection device and a screen; c) detecting a sensor-view shape of the screen based on the captured image of the screen; d) transforming the sensor-view shape of the screen depending on the screen distance to produce a projector-view shape of the screen; and e) modifying an image to be projected so as to fit it to the projector-view shape of the screen to project the modified image on the screen.

According to the present invention, the image projection device detects the screen by use of the installed image sensor, and corrects the shape of an image to be projected in accordance with the screen distance so as to fit it to the actually viewed shape of the screen. Therefore, the image projection device has the effect of automatically fitting the projected image to the shape of the screen which is viewed from the projector.

By using information on the shape of the screen detected by the image sensor, the screen distance can be also estimated and further precise correction of the projected image on the screen is possible.

DETAILED DESCRIPTION OF THE PREFERRED EMBODIMENTS

1. First Embodiment

Figure 1:
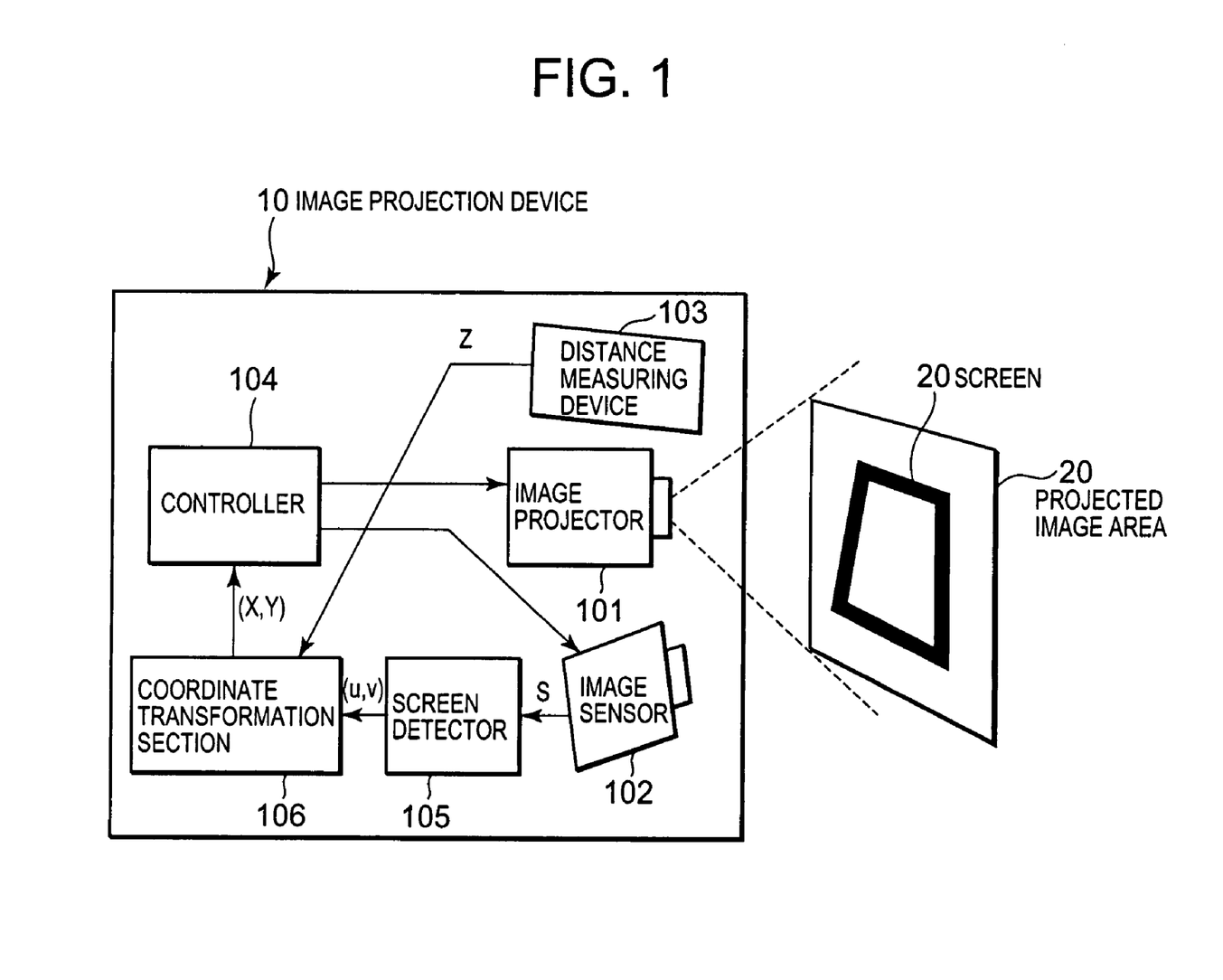
FIG. 1 is a block diagram showing an image projection device according to a first embodiment of the present invention.

Referring to FIG. 1, an image projection device 10 according to a first embodiment of the present invention projects a predetermined image on a screen 20 so that the screen 20 is included in a projected image area 30.

The image projection device 10 is provided with an image projector 101, an image sensor 102 and a distance measuring device 103. The image projector 101 is an image projection device in a conventional sense. The image projector 101 and the image sensor 102 are controlled by a controller 104. The distance measuring device 103 is an example of a distance determination means, which measures a distance between the image projection device 10 and the screen 20. The image projector 101 inputs image data from the controller 104, and projects the image into space. It is assumed that the screen 20 exists inside the projected image area 30. As shown in FIG. 1, the screen 20 generally has such structure that a black frame surrounds a white area to which an image is to be projected.

The image sensor 102 captures an image of the projected image area 30 including the screen 20 and outputs captured image data S to a screen detector 105. The screen detector 105 detects the position data (u,v) of the screen image from the capture image data S, which will be described later. A coordinate transformation section 106 inputs the position data (u,v) of the screen image from the screen detector 105 and the measured distance data from the distance measuring device 103 and transforms coordinates from (u,v) to (X,Y) which will be described later.

Detailed description of the first embodiment as shown in FIG. 1 will be provided with reference to FIGS. 2–8.

Figure 2:
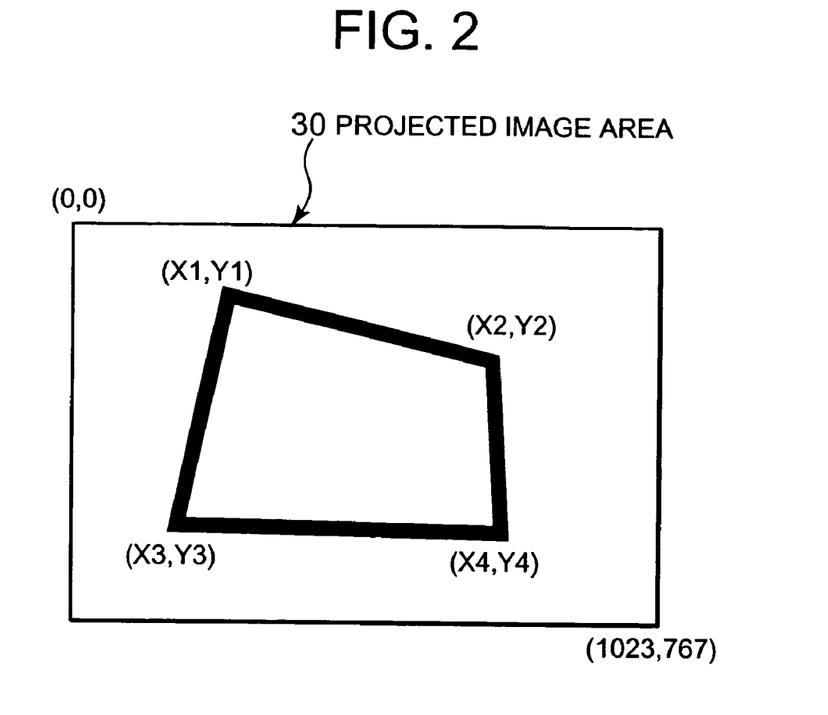
FIG. 2 is an explanatory view of a projected image area, which is used for explaining the fundamental operation of the present invention.

When the image projector 101 projects a whole uniformly white image into the space, a scene may look like as shown in FIG. 2 from the position of the image projector 101. The projected image area 30 generally takes a rectangular shape. When the projected image is, for example, in the size of XGA (1024×768 pixels), the position of an upper left pixel of the projected image area 30 is represented by (0, 0), and the position of a lower right pixel is represented by (1023, 767). The screen 20 is included within the projected image area 30, and the respective four corners of the screen correspond to the positions of pixels of (X1, Y1), (X2, Y2), (X3, Y3), and (X4, Y4) in the projected image.

It is essentially desired that the image projection device 10 projects the whole image on the whole surface of the screen 20. Thus, by fitting the four corners of the image to (X1, Y1), (X2, Y2), (X3, Y3), and (X4, Y4) and moving each pixel in the image to a corresponding position with the use of a distortion correction function, an observer who is right in front of the screen 20 can see the image without distortion. To carry out this, it is necessary to know the positions of the four corners of the screen, (X1, Y1), (X2, Y2), (X3, Y3) and (X4, Y4), in the projected area 30 of the image projection device 10, at the time of setting up the image projection device 10. In order to know the positions of the four corners of the screen 20, the image sensor 102 is used as described below.

The image sensor 102 captures an image of a scene obtained by projecting a uniform image such as, for example, the whole uniformly white image as described above. The shape of the screen image taken by the image sensor 102 should be a rectangle if the screen 20 is captured right in front of the image sensor 102.

Figure 3:
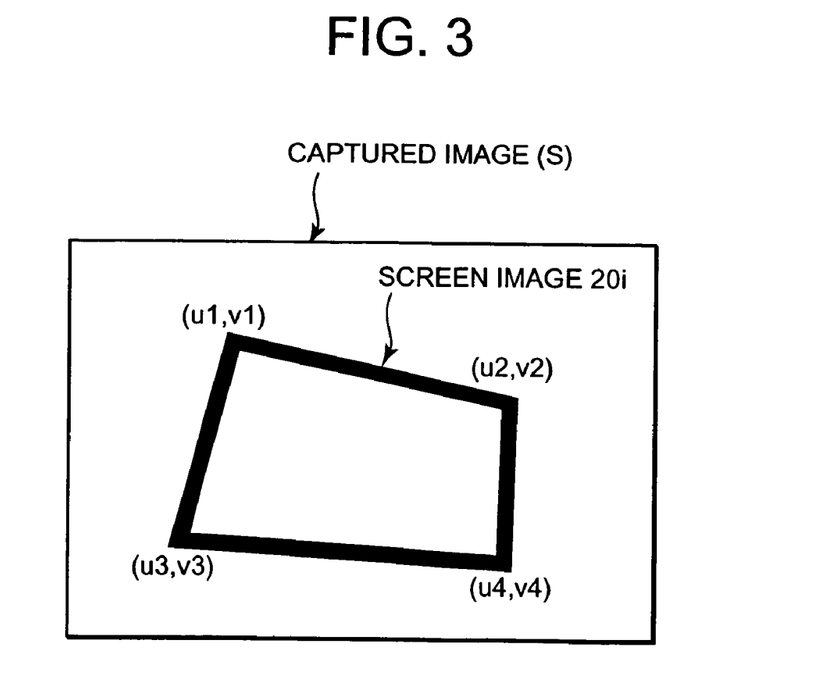
FIG. 3 is an explanatory view of an image captured by an image sensor in the first embodiment.

In general cases, however, as shown in FIG. 3, the screen 20 is captured into a shape of a distorted quadrilateral, as a screen image 20i within a captured image (S). The shape of the quadrilateral is similar to the shape of the screen of the projected image shown in FIG. 2, but is not the same actually because of difference in optical systems of the image projector 101 and the image sensor 102, and difference in mounting positions thereof. In a case of the actual image sensor 102, the screen image 20i does not neatly become quadrilateral due to the existence of distortion of the lens. However, it is assumed that the distortion of the lens has been already corrected in the image sensor 102 or processing means following the image sensor 102.

The screen detector 105 detects the four corners of the screen image 20i from the captured image S by use of image processing technology, to obtain the coordinates (ui, vi) (i=1, 2, 3, 4) of corner points. The coordinate transformation section 106 converts the obtained coordinates (ui, vi) (i=1, 2, 3, 4) of the corner points in a coordinate system of the captured image by the image sensor 102 into positions (Xi, Yi) (i=1, 2, 3, 4) in a coordinate system of the image projector 101. The controller 104, as described above, controls the image projector 101 to project the whole image while fitting the four corners of the image to (X1, Y1), (X2, Y2), (X3, Y3), and (X4, Y4) and moving each pixel to a corresponding position with the use of the distortion correction function. Therefore, the image to be projected is correctly projected on the whole screen 20.

When the foregoing processing is carried out, the coordinate transformation section 106 converts the coordinates of the four corner points obtained from the image sensor 102 into the coordinate system of the image projector 101. The coordinates (ui, vi) (i=1, 2, 3, 4) and (Xi, Yi) (i=1, 2, 3, 4) do not provide a one-to-one correspondence between them when the optical axis of the image projector 101 is not coincident with the optical axis of the image sensor 102. In the case where the positional relation between the image projector 101 and the image sensor 102 is fixed, if the distance between the image projector 101 and the screen 20 (hereinafter called screen distance) is sufficiently larger than the distance between the image projector 101 and the image sensor 102, an error is negligible. Thus, the correspondence between (ui, vi) (i=1, 2, 3, 4) and (Xi, Yi) (i=1, 2, 3, 4) may be initially calibrated. Otherwise, the correspondence between (ui, vi) (i=1, 2, 3, 4) and (Xi, Yi) (i=1, 2, 3, 4) varies in accordance with the screen distance. Therefore, it is necessary to calibrate the correspondence on a screen distance basis, and the coordinate transformation section 106 has to convert the coordinates with reference to the correspondence. The screen distance is received from the distance measuring device 103.

The distance measuring device 103 measures the distance from the image projecting device 10 to the screen 20, and outputs the measured distance to the coordinate transformation section 106. The coordinate transformation section 106, converts (ui, vi) (i=1, 2, 3, 4) into (Xi, Yi) (i=1, 2, 3, 4) with reference to the measured screen distance.

Hereinafter, detailed descriptions of the screen detector 105 and the coordinate transformation section 106 will be provided with reference to FIGS. 4-8.

Screen Detection

It is assumed that the image projector 101 projects a whole uniformly white image into the space and the screen 20 is illuminated with this projected light. If environment is adequately bright, such illumination is unnecessary.

The image sensor 102 takes the image of this scene, so that the captured image S as shown in FIG. 3 is obtained. The screen detector 105 processes the captured image S to calculate the positions of four corners, that is, an upper left (u1, v1), an upper right (u2, v2), a lower left (u3, v3), and a lower right (u4, v4).

Figure 4:
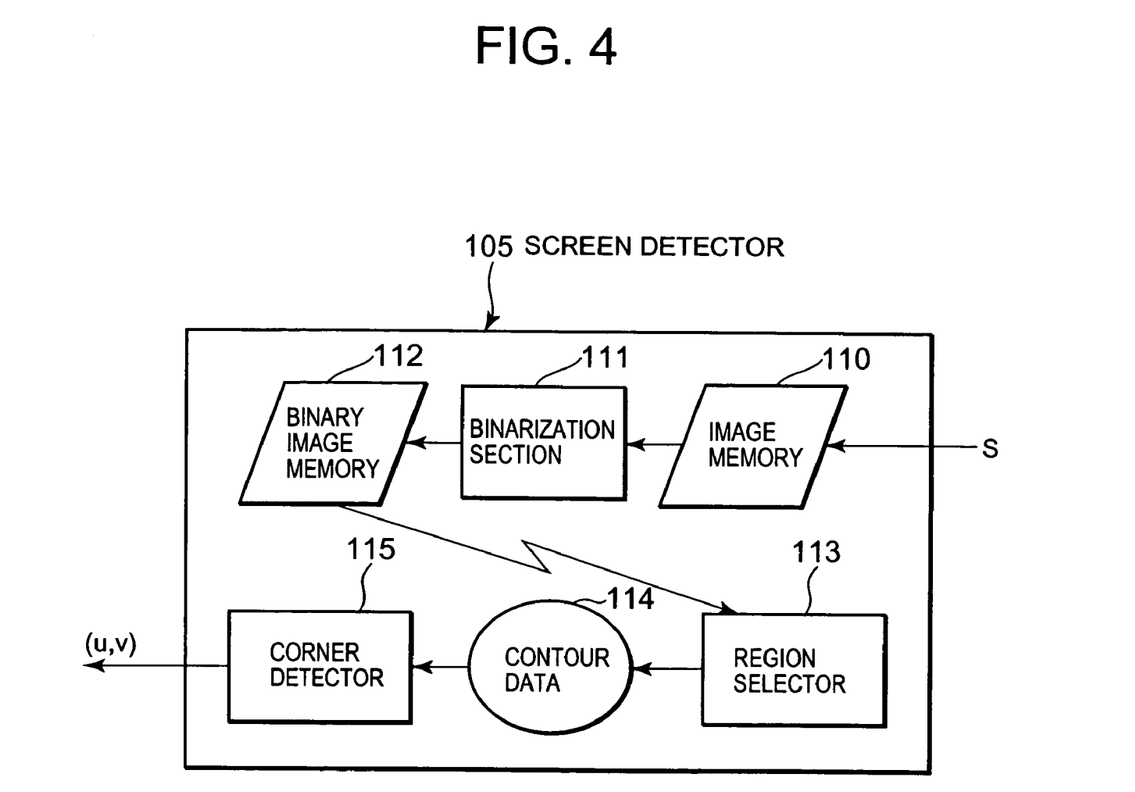
FIG. 4 is a block diagram showing a screen detector in the first embodiment.

Referring to FIG. 4, a functional structure of the screen detector 105 will be described. An image memory 110 stores the captured image data S. In the captured image data S, each pixel value is represented by f(u, v). The captured image data S is entered into a binarization section 111 to be subjected to binarization. The binary image data is outputted from the binarization section 111 to a binary image memory In the binary image stored in the binary image memory 112, each pixel value is represented by g(u, v), which is set at the value "1" or "0." If f(u, v) satisfies f(u, v)≧θ$_{th}$, where θ$_{th}$ is a predetermined threshold value, then the value "1" is written into a corresponding pixel of the g(u, v). Otherwise, the value "0" is written into the corresponding pixel. Since the screen 20 is usually white, the screen portion corresponding to the screen 20 provides g(u, v)=1.

According to this method, however, the screen portion may not be correctly extracted, in environment where the brightness of the scene varies. To flexibly determine the foregoing threshold value θ$_{th}$ in accordance with the image, for example, a method of discriminant analysis is available (refer to Otsu "*An Automatic Threshold Selection Method Based on Discriminant and Least Squares Criteria*", Institute of Electronics and Communication Engineers, Vol. J63-D, No. 4, pp. 349-356). According to this method, a histogram in the brightness of the pixels of the image is investigated, and the threshold value is determined in such a manner that an error is minimized when the image is divided into two areas, that is, a bright area and a dark area.

Figure 5:
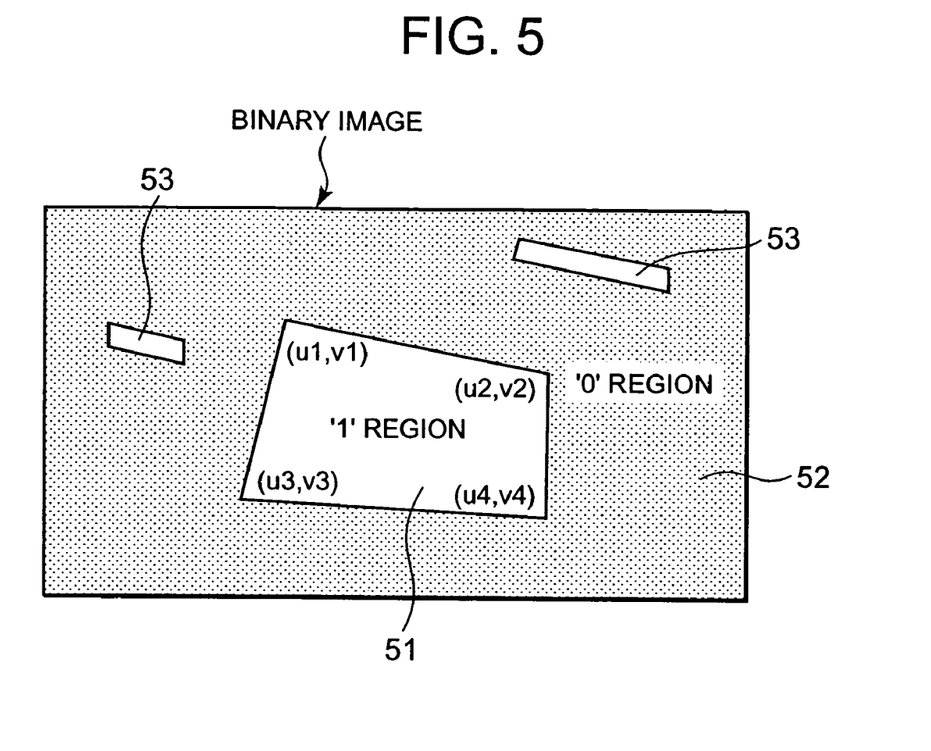
FIG. 5 is an explanatory view of a binary image obtained in the screen detector.

Thus, the binary image as shown in FIG. 5 is obtained from the original image S as shown in FIG. 3. There is a '1' region 51 corresponding to the screen 20 in the middle of the binary image, and the outside of the '1' region 51 is a '0' region 52. In many cases, however, redundant '1' regions 53 additionally exist around the '1' region 51 in accordance with the brightness of the scene. A region selector 113 traces the contour of the '1' regions 51 and 53 to isolate the areas in the binary image, in order to select only the contour of the '1' region 51 corresponding to the screen 20.

Selection criteria for obtaining a simple and effective result are as follows: a) select an area having the largest size; and b) select an area the barycenter of which is the nearest to the center of the image.

Figure 6:
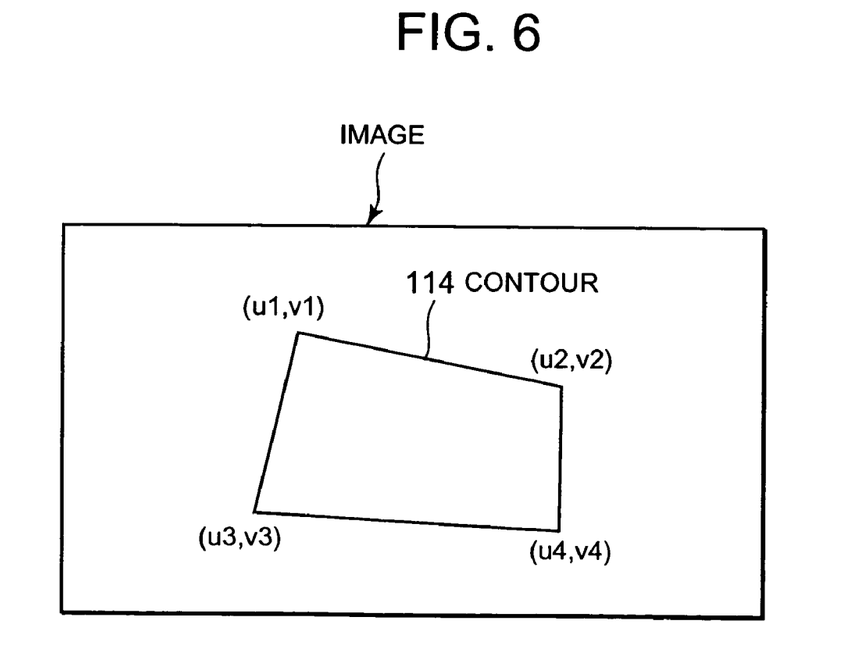
FIG. 6 is an explanatory view of an image for explaining a contour extraction operation of the screen detector.
Figure 7:
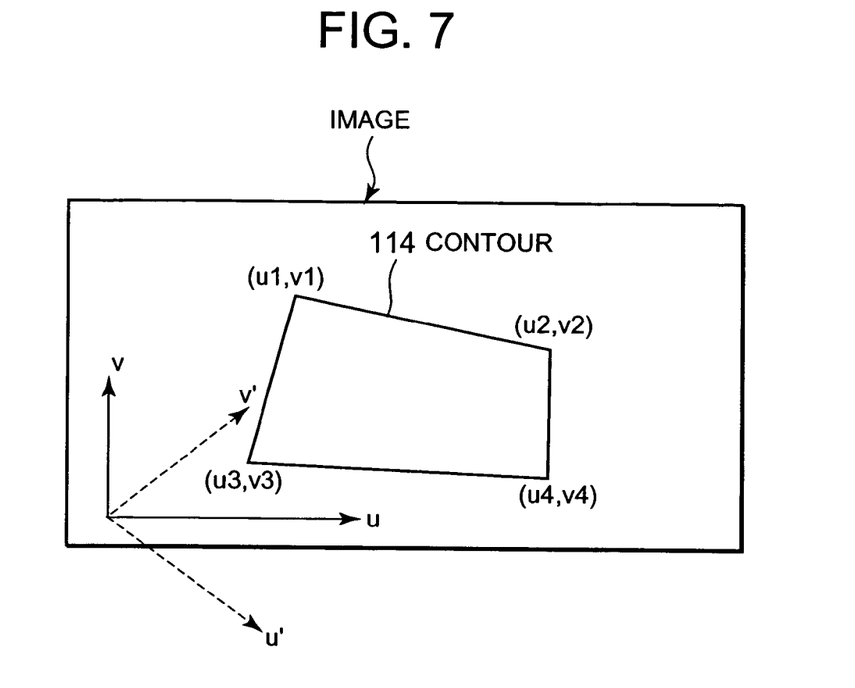
FIG. 7 is an explanatory view of an image for explaining a coordinate transformation operation of the screen detector.

By use of commonly known image processing technology, the area can be selected from the binary image on the basis of the foregoing criteria (a) and (b). Assuming that the contour data 114 of the screen portion obtained by the region selector 113 is as shown in FIG. 6, a corner detector 115 detects the four corners (u1, v1), (u2, v2), (u3, v3), and (u4, v4) to output them as the coordinates of the four corners of the screen to the coordinate transformation section 106.

An example of the above-described screen detecting process will be described below.

The image of the screen 20 is usually distorted from its original rectangle, but is not largely rotated. Thus, the coordinates (u, v) of the image of the screen 20 are converted into a coordinate system rotated 45 degrees by use of the following equations (1), with tracing contour pixels in the screen area.

$$u'=u-v$$

$$v'=u+v \quad (1)$$

Scaling processing such as normal rotation processing is not always necessary. (u', v') is in a coordinate system shown in FIG. 7-*with* respect to (u, v). With tracing the contour, a position minimizing u' is (u1, v1) which corresponds to an upper left corner point (u1', v1'). A position maximizing v' is (u2, v2) which corresponds to an upper right corner point (u2', v2'). A position minimizing v' is (u3, v3) which corresponds to a lower left corner point (u3', v3'), and a position maximizing u' is (u4, v4) which corresponds to a lower right corner point (u4', v4').

As described above, the coordinates of the four corners obtained by the screen detector 105 are represented by the coordinate system (u, v) depending on the image sensor 102. Thus, the coordinate transformation section 106 converts the coordinates into the coordinate system (X, Y) of the image projector 101.

The structure of the screen detector 105 described above is not limited to that of FIG. 4. In this embodiment, the contour is extracted by converting the captured image data into binary, and the corner points are detected. Commonly known edge detection means which uses Sobel operator or Laplacian operator may detect a position at which a pixel value abruptly changes in the image. The contour may be extracted by connecting such detected positions, and the positions of corner points may be obtained by a corner detector similar to the foregoing corner detector 115. Otherwise, the contour is approximated by straight lines or line segments, and intersection points thereof may be determined as corner points.

Distance Measurement

The distance measuring device 103 may employ a well-known distance measuring technique. For example, a distance measuring arrangement of an auto-focus camera can be used, in which the reflection of incident infrared rays from an object is sensed, and distance is obtained by the principle of triangulation. Considering that the distance measuring device 103 senses the position of an object as a whole, the obtained distance Z is outputted to the coordinate transformation section 106.

Coordinate Transformation

Figure 8:
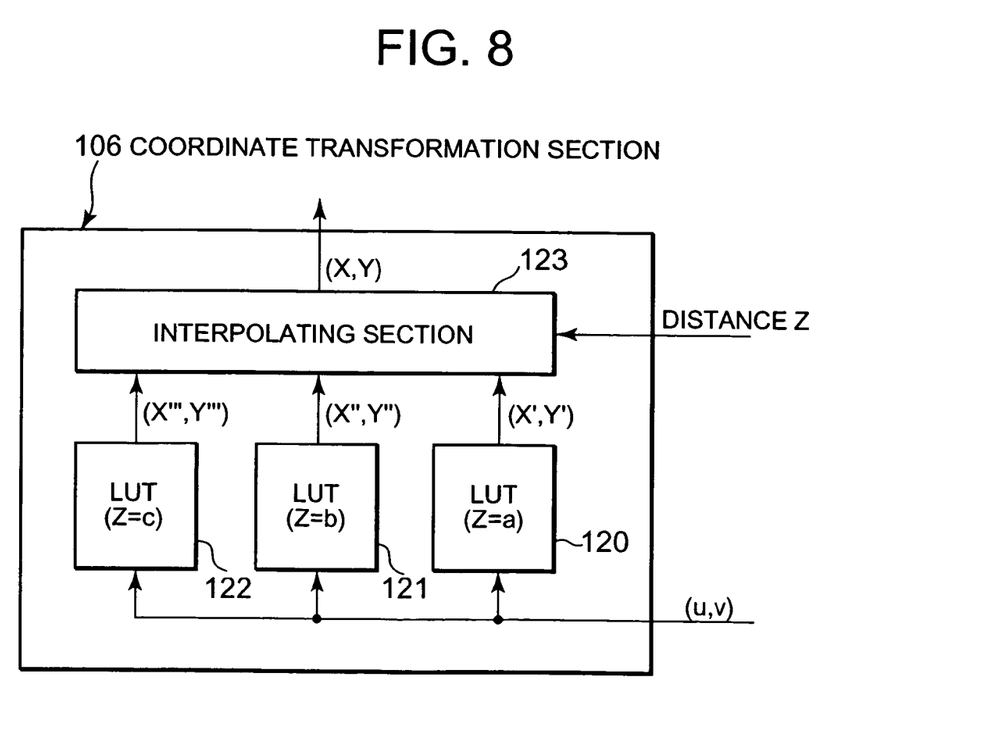
FIG. 8 is a block diagram showing a coordinate transformation section in the first embodiment.

FIG. 8 shows an example of the coordinate transformation section 106. The coordinate transformation section 106 is provided with three lookup tables (LUTs), that is, first LUT 120, second LUT 121 and third LUT 122, and an interpolating section 123. Since the correspondence between (u, v) and (X, Y) differs depending on a distance between the image projector 101 and the screen 20, as mentioned above, calibration is carried out in advance on some representative distances (here, three distances a, b and c).

In this example, the first LUT 120 stores a correspondence between (u, v) and (X, Y) in a case that the distance Z between the image projector 101 and the screen 20 is a=1 meter. Accordingly, provided with (u, v), the first LUT 120 outputs (X', Y') which is (X, Y) in a case that the screen 20 is disposed at a distance of 1 meter away. In a like manner, the second LUT 121 stores a correspondence between (u, v) and (X, Y) in a case that the distance Z between the image projector 101 and the screen 20 is b=2 meters. Accordingly, provided with (u, v), the second LUT 121 outputs (X", Y") which is (X, Y) in a case that the screen 20 is disposed at a distance of 2 meters away. The third LUT 122 stores a correspondence between (u, v) and (X, Y) in a case that the distance Z between the image projector 101 and the screen 20 is c=3 meters. Accordingly, provided with (u, v), the third LUT 122 outputs (X''', Y''') which is (X, Y) in a case that the screen 20 is disposed at a distance of 3 meters away.

The interpolating section 123 inputs the outputs (X', Y'), (X", Y"), and (X''', Y''') of the first LUT 120, the second LUT 121, and the third LUT 122, respectively, and outputs a coordinate (X, Y) which are obtained from the outputs (X', Y'), (X", Y"), and (X''', Y''') by interpolation depending on the distance Z measured by the distance measuring device 103.

Taking a case of Z=1.5 meters as an example, a required value (X, Y) is at the midpoint between an output (X', Y') from the first LUT 120 and an output (X", Y") from the second LUT 121. Thus, the interpolating section 123 obtains the positions of the four corners in the coordinate system of the image projector 101 with the use of the following equations (2), and outputs them to the controller 104.

$$X=0.5X'+0.5X''$$

$$Y=0.5Y'+0.5Y'' \qquad (2)$$

The controller 104 forms a modified image by moving the four corners of the whole image to conversion results (X1, Y1), (X2, Y2), (X3, Y3) and (X4, Y4) and distorting the whole image correspondingly, and sends the modified image to the image projector 101. The image projector 101 projects the modified image, so that it is possible to realize the projection of the image corresponding with the position and shape of the screen 20.

The structure of the coordinate transformation section 106 is not limited to that of FIG. 5. In the structure shown in FIG. 8, a representative value of (X, Y) corresponding to (u, v) is obtained in each of the tables for representative values of the distance Z, and A resultant (X, Y) is calculated by interpolation processing on the basis of the actually measured distance. Alternatively, a resultant value of (X, Y) may be obtained by referring to a three-dimensional table for (u, v, Z) at a calibration stage or by using a transformation expression such as a polynomial to an approximate value of (X, Y) for (u, v, Z).

Further, the coordinate transformation section 106 may be provided with a plurality of lookup tables (LUTs) each storing a correspondence between (u, v) and (X, Y) for a corresponding preset distance between the image projector, 101 and the screen 20. The number of LUTs is not limited to 3 as described in the present embodiment.

2. Second Embodiment

Figure 9:
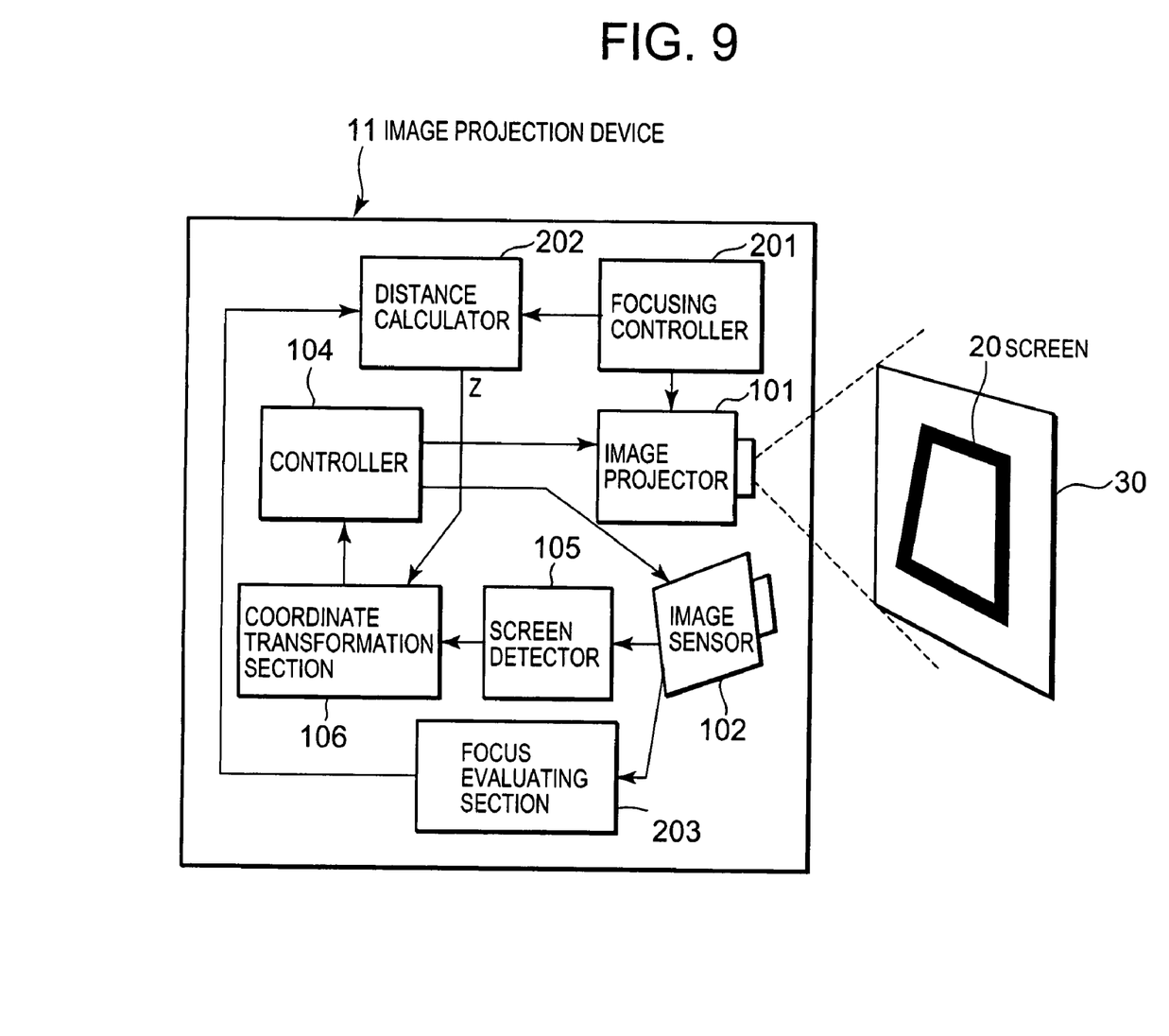
FIG. 9 is a block diagram showing an image projection device according to a second embodiment of the present invention.

Next, a second embodiment of the present invention will be described with reference to FIG. 9. An image projection device 11 according to the second embodiment is not provided with the distance measuring device 106 of the first embodiment but another distance determination means as described below.

In the second embodiment, a controller 104 prepares an appropriate image before screen detection processing, and an image projector 101 projects this appropriate image on the screen 20. At this time, a focusing controller 201 performs a focus shifting operation of the image projector 101 for the projected image by operation such as turning a focus ring of the image projector 101. Accordingly, images with various degrees of focus are captured by the image sensor 102, and a focus evaluating section 203 evaluates a degree of focus of the projected image with the use of a well-known method, such as evaluating the contrast and sharpness of its, edge or the like.

A distance calculator 202 calculates the distance Z between the image projecting device 11 and the screen 20 from a focus position of the image projector 101, at which the focus evaluating section 203 evaluates that the projected image is most sharply in focus. The obtained distance Z is used in the coordinate transformation section 106 and used for conversion processing from (u, v) to (X, Y), as in the case of the first embodiment.

3. Third Embodiment

In the above-described embodiments, a single distance Z is obtained in the whole screen by the distance-measuring device 103 or the distance calculator 202. However, the reason why the image of the screen 20 is distortedly displayed is that the surface of the screen 20 is not orthogonal to a projecting direction. Thus, the distances from the image projection device to each point of the screen are different from one another. Therefore, an error occurs when coordinates are converted from (u, v) to (X, Y) with using the same distance Z on detected four corners of the screen 20. The screen detector 104, however, has already obtained the positions of the four corners of the screen in the image as described before, so that, it is possible to estimate the distances of the four corners with making use of the obtained positions of the four corners.

Figure 10A:
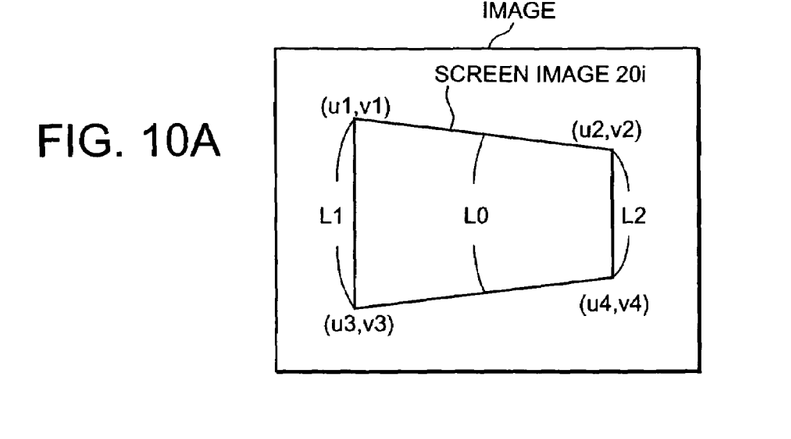
FIG. 10A is an explanatory view of an image for explaining the precise estimation of distance in an image projection device according to a third embodiment of the present invention.

As shown in FIG. 10A, more specifically, it is assumed that an image 20$i$ of the screen 20 is captured. Since a left side is longer than a right side in the captured screen image 20$i$, it is found that the image projector 101 projects the image from a left direction. The length of the left side is denoted by L1, and the length of the right side is denoted by L2. The screen itself is rectangular, and the length of a left side is equal to that of a right side.

Figure 10B:
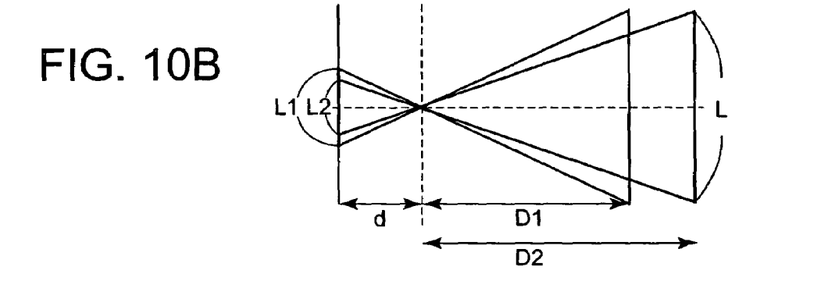
FIG. 10B is a diagram for explaining the precise estimation of distance in the third embodiment.

In this case, as shown in FIG. 10B, the difference between L1 and L2 depends on difference in distance to each side. In other words, when a side having a length of L is at a distance of D1, the side is captured with a length of L1. When the side is at a distance of D2, the side is captured with a length of L2. This relation is represented by the following equations (3):

$$L1=(L/D1)d$$

$$L2=(L/D2)d \qquad (3).$$

Therefore, the relation between the two distances of D1 and D2 is represented by the following equation (4):

$$D2=(L1/L2)D1 \qquad (4).$$

Assuming that a single average distance D0 between the image projector 101 and the screen 20 can be calculated and, as shown in FIG. 10B, it corresponds to a vertical length $L0=(L1+L2)/2$ at a midpoint in the whole screen, it is possible to estimate the distance D1 of the two left corner points and the distance D2 of the two right corner points by the following equations (5):

$$D1=(L0/L1)D0$$

$$D2=(L0/L2)D0 \qquad (5).$$

The equations (4) and (5) use the lengths of the left side and the right side. In a like manner, the distance may be estimated with using a top side and a bottom side. Furthermore, relation in the distance of the four corners may be precisely obtained with making use of the lengths of the four sides.

Another example of the coordinate transformation section 106 with improved precision will be described with reference to FIG. 11.

Figure 11:
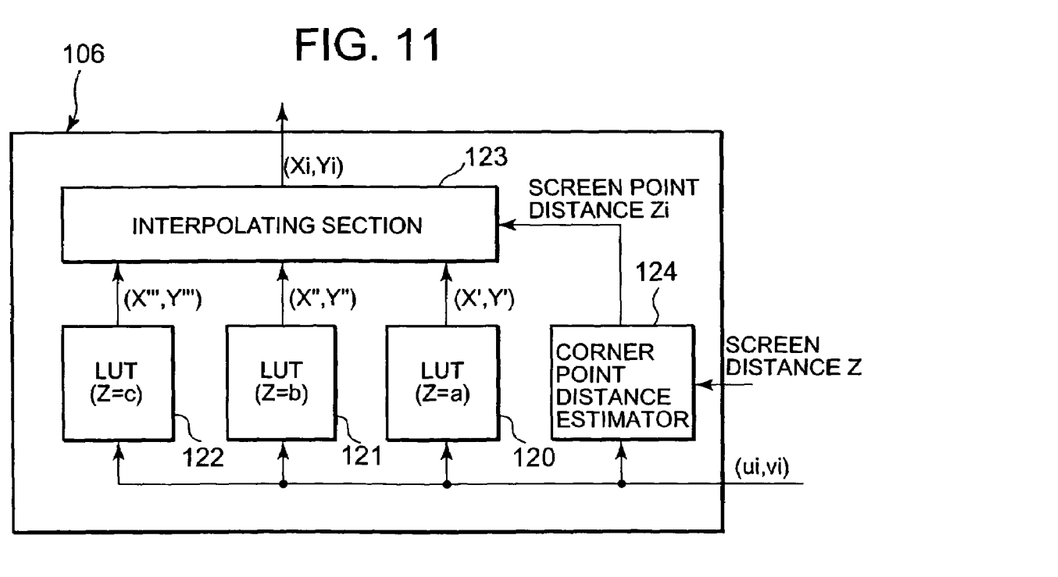
FIG. 11 is a block diagram showing a coordinate transformation section in the third embodiment.

As shown in FIG. 11, the coordinate transformation section 106 is provided with the first LUT 120, the second LUT 121, the third LUT 122, the interpolating section 123, and a corner point distance estimator 124. Since the correspondence between (ui, vi) and (Xi, Yi),differs depending on a distance between the image projector 101 and each corner point of the screen 20, as mentioned above.

When the pixel positions (ui, vi) (i=1 to 4) of the four corners are inputted from the screen detector 105, the corner point distance estimator 124 uses the coordinates of the four corners and the distance Z obtained by the distance measuring device 103 or the distance calculator 202 to estimate distance values Zi (i=1 to 4) of the four corners according to the above equation (4). Since (ui, vi) is provided to the first to third LUTs 120-122, the interpolating section 123 outputs (Xi, Yi) by use of Zi with respect to (X', Y'), (X", Y"), and (X''', Y''') inputted respectively from the first to third LUTs 120-122. According to this structure, it is possible to improve the precision of the corner points in the obtained coordinate system of the image projection device.

4. Fourth Embodiment

Figure 12:
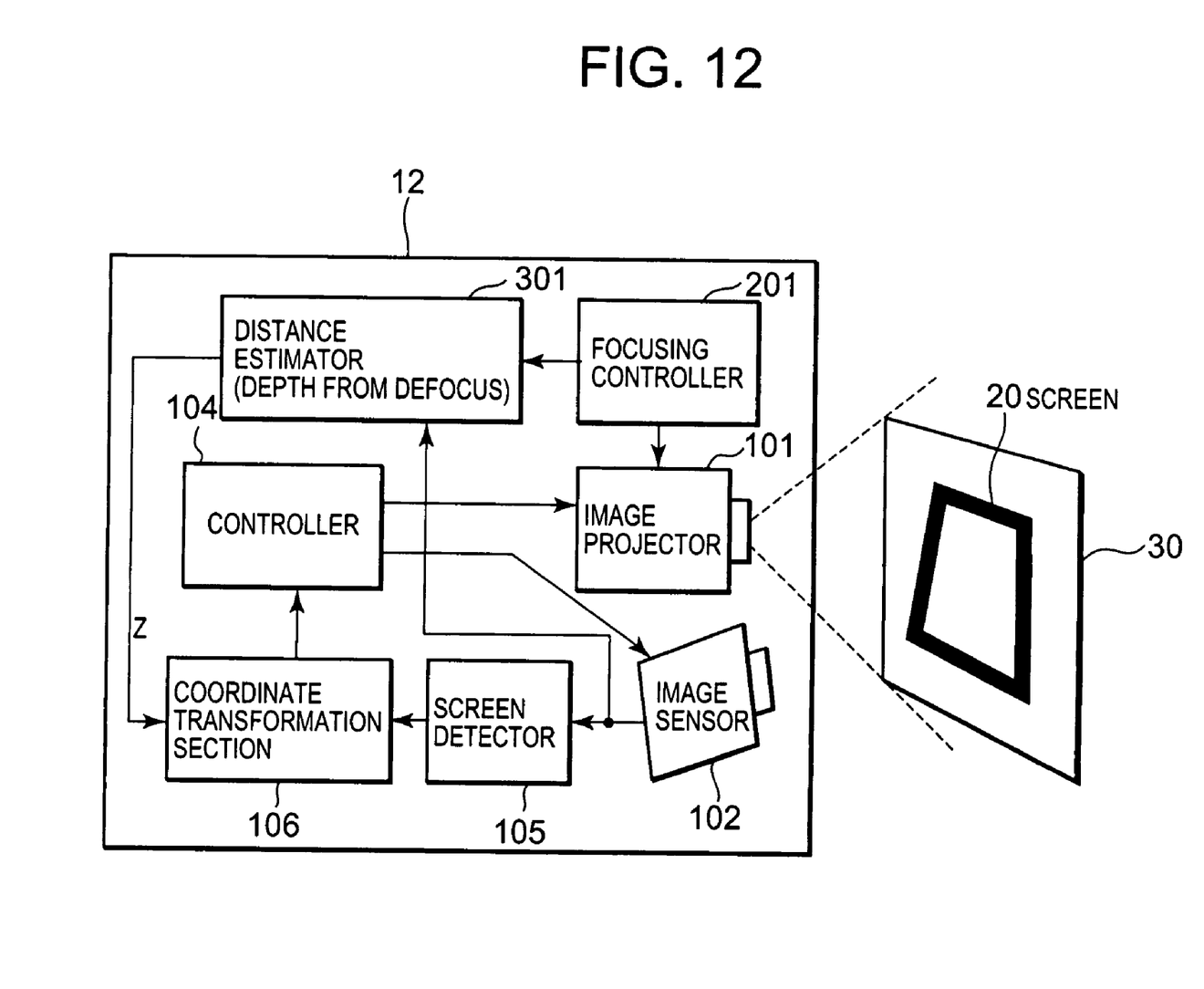
FIG. 12 is a block diagram showing an image projection device according to a fourth embodiment of the present invention.

Then, a fourth embodiment will be described with reference to FIG. 12. An image projection device 12 according to the fourth embodiment is not provided with the focus evaluating section 203 of the second embodiment but another distance determination means as described below.

In the fourth embodiment, a focusing controller 201 sets an image projector 101 at a predetermined focus position, and the image projector 101 projects a predetermined image on the screen 20. The image sensor 102 captures the projected image 30, and the captured image data is sent to a distance estimator 301. The distance estimator 301 evaluates a degree of defocusing of the projected image to estimate a screen distance. This method is a well-known technology called Depth From Defocus in the field of computer vision, which can obtain rough distance. Then, as in the case of the first embodiment, the coordinate transformation section 106 converts coordinates from (u, v) to (X, Y).

What is claimed is:

1. An image projection device comprising:
   an image projector for projecting an image on a screen;
   an image sensor for capturing an image of the screen;
   a distance determining section for determining a screen distance between the image projection device and the screen;
   a screen detector for detecting a sensor-view shape of the screen from the captured image of the screen;
   a screen shape transformer for transforming the sensor-view shape of the screen based on the screen distance to produce a projector-view shape of the screen; and
   an image modifier for modifying an image to be projected so as to fit it to the projector-view shape of the screen to output the modified image to the image projector.

2. The image projection device according to claim 1, wherein the screen shape transformer comprises:
   a coordinate transformer for transforming a sensor coordinate system describing the sensor-view shape of the screen to a projector coordinate system depending on the screen distance, to produce the projector-view shape of the screen.

3. The image projection device according to claim 2, wherein the coordinate transformer comprises:
   a plurality of coordinate transformation tables, each of which stores a correspondence between the sensor coordinate system and the projector coordinate system for a corresponding one of a plurality of predetermined screen distances; and
   an interpolator for interpolating a plurality of projector-view shapes of the screen based on the screen distance to produce the projector-view shape of the screen corresponding to the sensor-view shape of the screen, wherein the plurality of projector-view shapes of the screen are obtained from respective ones of the coordinate transformation tables when inputting the sensor-view shape of the screen.

4. The image projection device according to claim 1, wherein the screen shape transformer comprises:
   a distance estimator for estimating a screen point distance between the image projection device and each of a plurality of representative points of the screen based on the screen distance and the sensor-view shape of the screen; and
   a coordinate transformer for transforming a sensor coordinate system describing the sensor-view shape of the screen to a projector coordinate system depending on estimated screen point distances for the representative points, to produce the projector-view shape of the screen.

5. The image projection device according to claim 4, wherein the coordinate transformer comprises:
   a plurality of coordinate transformation tables, each of which stores a correspondence between the sensor coordinate system and the projector coordinate system for a corresponding one of a plurality of predetermined screen distances; and
   an interpolator for interpolating a plurality of projector-view shapes of the screen based on the estimated screen point distances for the representative points to produce the projector-view shape of the screen corresponding to the sensor-view shape of the screen, wherein the plurality of projector-view shapes of the screen are obtained from respective ones of the coordinate transformation tables when inputting the sensor-view shape of the screen.

6. The image projection device according to claim 1, wherein the distance determining section is a distance measuring device which measures the screen distance by monitoring a transmitted signal reflected from the screen.

7. The image projection device according to claim 1, wherein the distance determining section comprises:
 a focus evaluator for evaluating a degree of focus of the image projected on the screen based on the captured image of the screen;
 a focus controller for changing a focus position of the image projector; and
 a distance calculator for calculating the screen distance by determining a focus position maximizing the degree of focus of the image projected on the screen.

8. The image projection device according to claim 1, wherein the distance determining section comprises:
 a focus controller for setting the image projector at a predetermined focus position; and
 a distance estimator for estimating the screen distance from a degree of defocus of the captured image.

9. An image projection method for an image projection device having an image projector and an image sensor, the method comprising:
 a) capturing an image of the screen by the image sensor;
 b) determining a screen distance between the image projection device and a screen;
 c) detecting a sensor-view shape of the screen based-on the captured image of the screen;
 d) transforming the sensor-view shape of the screen depending on the screen distance to produce a projector-view shape of the screen; and
 e) modifying an image to be projected so as to fit it to the projector-view shape of the screen to project the modified image on the screen.

10. The image projection method according to claim 9, wherein the step d) comprises:
 transforming a sensor coordinate system describing the sensor-view shape of the screen to a projector coordinate system depending on the screen distance, to produce the projector-view shape of the screen.

11. The image projection method according to claim 9, wherein the step d) comprises:
 estimating a screen point distance between the image projection device and each of a plurality of representative points of the screen based on the screen distance and the sensor-view shape of the screen; and
 a transforming a sensor coordinate system describing the sensor-view shape of the screen to a projector coordinate system depending on estimated screen point distances for the representative points, to produce the projector-view shape of the screen.

* * * * *